May 10, 1966  R. L. ALLEN  3,250,262
METHOD OF AND APPARATUS FOR CONTROLLING THE AIR-FUEL
RATIO OF A FOUR-STROKE CYCLE ENGINE
Filed May 31, 1963  3 Sheets-Sheet 1

INVENTOR.
ROBERT L. ALLEN
BY
Newton, Hopkins & Jones
ATTOREYS

May 10, 1966  R. L. ALLEN  3,250,262
METHOD OF AND APPARATUS FOR CONTROLLING THE AIR-FUEL
RATIO OF A FOUR-STROKE CYCLE ENGINE
Filed May 31, 1963  3 Sheets-Sheet 3

*INVENTOR.*
ROBERT L. ALLEN

BY Newton, Hopkins & Jones

ATTORNEYS

United States Patent Office 3,250,262
Patented May 10, 1966

3,250,262
METHOD OF AND APPARATUS FOR CONTROLLING THE AIR-FUEL RATIO OF A FOUR-STROKE CYCLE ENGINE
Robert L. Allen, Atlanta, Ga., assignor to Georgia Tech Research Institute, Atlanta, Ga., a corporation of Georgia
Filed May 31, 1963, Ser. No. 284,695
10 Claims. (Cl. 123—119)

This invention relates to methods of controlling the fuel used by internal combustion engines and more particularly to a method of and apparatus for controlling the air-fuel ratio of a combustible mixture used in an Otto or four-stroke cycle internal combustion engine so as to obtain maximum thermal efficiency or maximum horsepower under widely varying engine operating conditions.

Combustion in an Otto or four-stroke cycle engine requires the presence in the combustion chambers of the engine of a mixture of a hydrocarbon fuel and air which will propagate a flame or its otherwise combustible. With most hydrocarbons used as fuels for internal combustion engines, the mixture of air and fuel for maximum combustibility contains approximately fifteen pounds of air to each pound of fuel. This theoretical mixture of maximum combustibility for a particular hydrocarbon fuel is frequently referred to as the stoichiometric mixture for the fuel.

However, with most of the hydrocarbon fuels customarily used with Otto or four-stroke cycle engines there is a wide range of combustible mixtures having the air and fuel in different proportions from those of a stoichiometric mixture. Thus, for many fuels, combustible mixtures are possible with as little as nine pounds of air for each pound of fuel and with as much as eighteen pounds of air for each pound of fuel. Those combustible mixtures having less air for each pound of fuel than the stoichiometric mixture for the particular fuel are customarily referred to as rich and those combustible mixtures having more air than the stoichiometric mixture for the particular fuel are customarily referred to as lean. An Otto or four-stroke cycle engine will operate on a stoichiometric mixture or on a rich or lean mixture.

Although a four-stroke cycle engine will operate with the amount of air for a given amount of fuel varying within relatively wide limits, the operation of the engine at maximum thermal efficiency or maximum horsepower requires that the quantity of air mixed with a particular quantity of fuel for the air-fuel ratio to be controlled within relatively narrow limits. This is because maximum thermal efficiency or maximum horsepower for an engine is obtained with a certain air-fuel ratio and any variation from this air-fuel ratio will reduce the thermal efficiency or the horsepower of the engine.

When a four-stroke cycle engine is used under relatively stable and constant operation conditions, the control of the air-fuel ratio for maximum thermal efficiency or maximum horsepower is relatively simple since the air-fuel ratio necessary for maximum thermal efficiency or maximum horsepower remains constant. However, when the engine is operated under widely varying operating conditions, the control of the air-fuel ratio for maximum thermal efficiency or maximum horsepower is complicated by the fact that the air-fuel ratio providing maximum thermal efficiency or maximum horsepower varies with the operating conditions under which the engine is operating.

For example, it is well known that for four-stroke cycle engines, the air-fuel ratio necessary for maximum thermal efficiency or maximum horsepower changes as operating conditions change the intake manifold pressure and the engine speed. For each combination of intake manifold pressure and engine speed there is a particular air-fuel ratio for the combustible mixture used by the engine which will produce maximum thermal efficiency at that manifold pressure and engine speed and a particular air-fuel ratio for the combustible mixture used by the engine which will produce maximum horsepower at that intake manifold pressure and engine speed.

Since the air-fuel ratio for maximum thermal efficiency or maximum horsepower is a function of intake manifold pressure and engine speed, numerous methods have been previously devised for controlling the air-fuel ratio of the mixture used by an engine in response to changes in intake manifold pressure and engine speed. These previous methods have customarily varied the amount of fuel mixed with the air drawn into the engine with each intake stroke and if the amount of air taken into the engine with each intake stroke is constant throughout the operating range of the engine and if the method is properly responsive to intake manifold pressure and engine speed, such control methods will provide an air-fuel ratio for maximum thermal efficiency or maximum horsepower over the operating range of the engine.

However, the difficulty with many of these previous methods is that the amount of air taken into the engine with each intake stroke is generally not constant over the operating range of most four-stroke cycle engines. It is well known that the unit air charge or pounds of air taken into the engine with each intake stroke varies with intake manifold pressure and engine speed. Thus, a method of controlling the air-fuel ratio of an engine to obtain maximum thermal efficiency or maximum horsepower must not only be responsive to changes in intake manifold pressure and engine speed but also to changes in the unit air charge to which the fuel is being added. If the method is not responsive to changes in unit air charge, it will simply be adding fuel to air as if the air were a constant quantity.

Some previous methods for controlling the air-fuel ratio of engines have attempted to take into consideration all three variables, intake manifold pressure, engine speed, and unit air charge. These previous methods have generally avoided using unit air charge directly in the controlling of air fuel ratio because of practical difficulties involved in measuring unit air charge directly. Rather, these previous methods have generally used changes in intake manifold pressure and engine speed as criteria or indicators of changes in unit air charge.

Intake manifold pressure is easily used in controlling air-fuel ratio by simply connecting a tube of known type between the means used to add fuel and the interior of the intake manifold. Similarly, engine speed is easily used in controlling air-fuel ratios by simply using engine revolutions for driving the means used to add fuel. However, the relationship among intake manifold pressure, engine speed and air-fuel ratio is not the same as the relationship among intake manifold pressure, engine speed and unit air charge. This results in previous methods of controlling air-fuel ratios using intake manifold pressure and engine speed as indicative of unit air charge having to relate intake manifold pressure and engine speed twice.

Using manifold pressure and engine speed to control and drive the means used to add fuel has proven to be a convenient manner for relating intake manifold pressure and engine speed to air-fuel ratio without regard to changes in unit air charge. However, adding unit air charge in terms of intake manifold pressure and engine speed to the control of air-fuel ratio has made this method of control unsatisfactory. This is because methods relating intake manifold pressure and engine speed in order to take changes in unit air charge into consideration have required expensive, complicated and difficult to maintain mechanical arrangements which have often proved to be unsatisfactory.

The method of controlling the air-fuel ratio for four-stroke cycle engines disclosed herein completely overcomes these and other difficulties encountered in using previous methods for controlling the air-fuel ratio of four-stroke cycle engines. The invention overcomes these difficulties by eliminating the use of unit air charge as a function of intake manifold pressure and engine speed and by taking changes in unit air charge into consideration as a function of intake manifold pressure and throttle position. With the method, convenient and inexpensive means may be used to relate throttle position and intake manifold pressure so that changes in intake manifold pressure and engine speed are indicative of changes in unit air charge and once intake manifold pressure and throttle position have been related in this manner, they can be combined with intake manifold pressure to provide for the accurate and precise control of the air-fuel ratio of an engine.

The method and one embodiment of apparatus suitable to the method will be more clearly understood from the following detailed description and the accompanying drawings in which like characters of reference designate corresponding parts in all figures and in which.

These figures and the following detailed description disclose a preferred specific embodiment of the invention but the invention is not limited to the details disclosed since it may be embodied in other equivalent forms.

The method of the invention is best understood by considering it in relation to those previous methods of controlling the air-fuel ratio of engines which have also been responsive to changes in the unit air charge of an engine with cahnges in the operating conditions of the engine. In considering this relationship between the method of the invention and previous methods, the graph shown in FIG. 1 is helpful.

The solid line 10 shows the relationship between unit air charge or pounds of air per intake stroke and intake manifold pressure when an engine is run at a constant speed but at various throttle positions. The solid lines 11, 12, and 13 show the same relationship but at various other constant engine speeds than that represented by line 10. The solid lines 10, 11, 12, and 13 are but representative of the plurality of lines which are obtained when the throttle position is varied while the engine is run at various constant speeds. To obtain additional solid lines such as lines 10, 11, 12, and 13, it is simply necessary to run the engine at more than four constant speeds while varying throttle position and to obtain and record intake manifold pressure and engine speed using known techniques.

Figure 1:
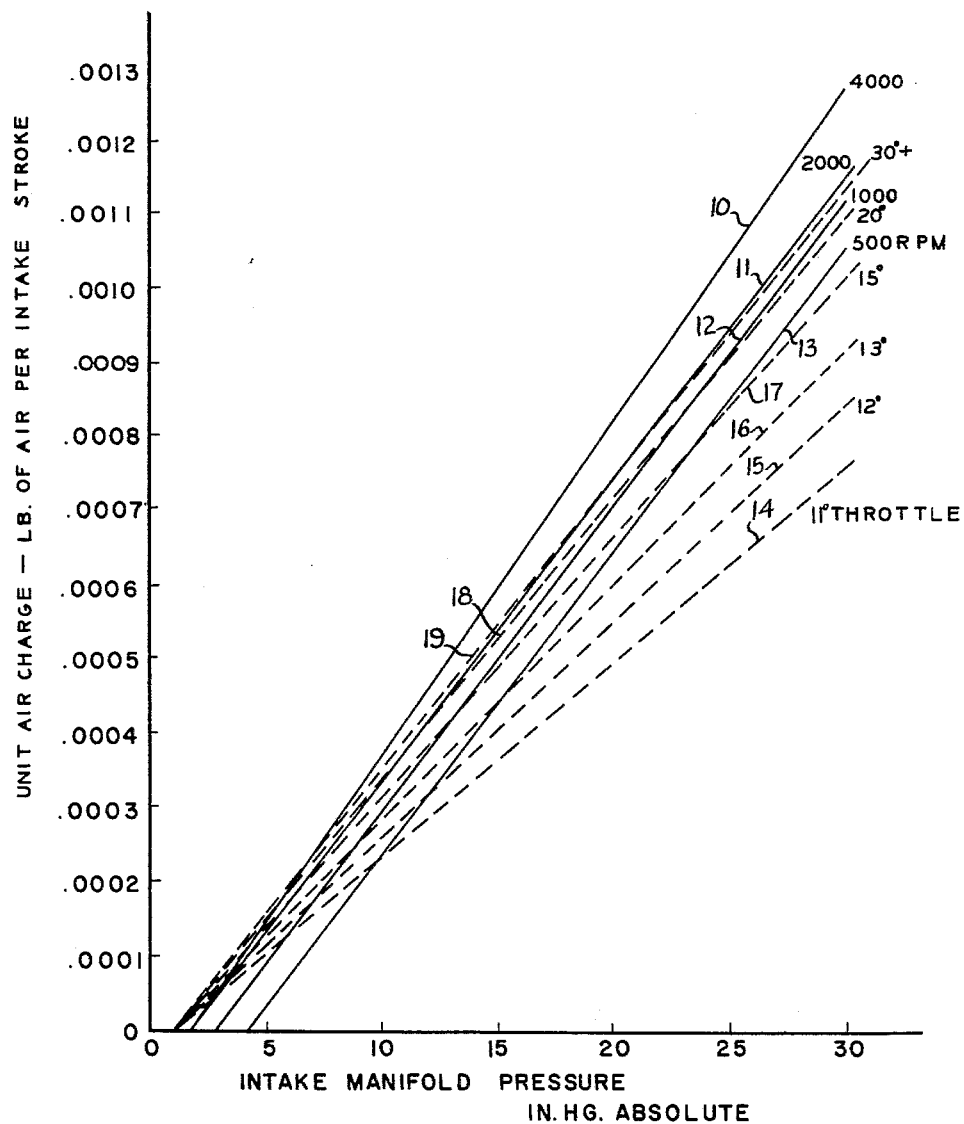
FIG. 1 is a graph showing by solid lines the changes in unit air charge and intake manifold pressure when an engine is run at various constant speeds with throttle position varying and by dashed lines the changes in unit air charge and manifold pressure when an engine is run at various constant throttle positions with engine speed varying.

Lines such as lines 10, 11, 12, and 13 are well known and they graphically reveal the relationship between intake manifold pressure, engine speed and unit air charge and although the specific values of intake manifold pressure, engine speed, and unit air charge shown in FIG. 1 are only representative and will vary from one engine to another, the general relationship shown by lines such as lines 10, 11, 12, and 13 will be the same from one four-stroke cycle to another. It is this relationship which previous methods of controlling the air-fuel ratios for engines have utilized when using intake manifold pressure and engine speed as criteria of the unit air charge. The practical difficulties in relating intake manifold pressure and engine speed so that their relationship at any given moment is representative of unit air charge is the reason that these previous methods of controlling the air-fuel ratio for an engine have been complicated, expensive, and often unreliable.

The dashed line 14 of the graph in FIG. 1 shows the relationship between unit air charge or pounds of air per intake stroke and intake manifold pressure when an engine is run at a constant throttle position but at various engine speeds. The dashed lines 15, 16, 17, 18 and 19 show the same relationship as the dashed line 14 but at other constant throttle positions than that represented by the dashed line 14. Similar to the previously known solid lines shown in FIG. 1, the dashed lines 14, 15, 16, 17, 18, and 19 and additional dashed lines can be obtained for any four-stroke cycle engine by using known techniques for obtaining and recording intake manifold pressure and unit air charge while running the engine a plurality of times at various constant throttle positions but with the engine speed varying. As with the solid lines of FIG. 1, the specific values of intake manifold pressure, unit air charge, and constant throttle position related by a dashed line such as dashed line 15 will vary from one engine to another, but the character of the line will remain the same for all four-stroke cycle engines.

Dashed lines such as lines 14, 15, 16, 17, 18, and 19 show that the unit air charge for an engine at various operating conditions is a function of intake manifold pressure and throttle position and that if intake manifold pressure and throttle position are known, the unit air charge can be predicted. Thus, the air-fuel ratio of a four-stroke cycle engine can be controlled by using intake manifold and engine speed in known manner as indicators of required air-fuel ratio and intake manifold pressure and throttle position as indicators of the quantity of air to which fuel must be added to obtain the proper air-fuel ratio.

The method of the invention is based upon the dashed lines of FIG. 1 and previous methods of controlling air-fuel ratio have been based upon the solid lines of FIG. 1. The method of the invention uses throttle position rather than engine speed as an indicator of the quantity of air to which fuel must be added to obtain maximum thermal efficiency, maximum horsepower, or any other operating characteristic obtainable within rather narrow limits.

Figure 2:
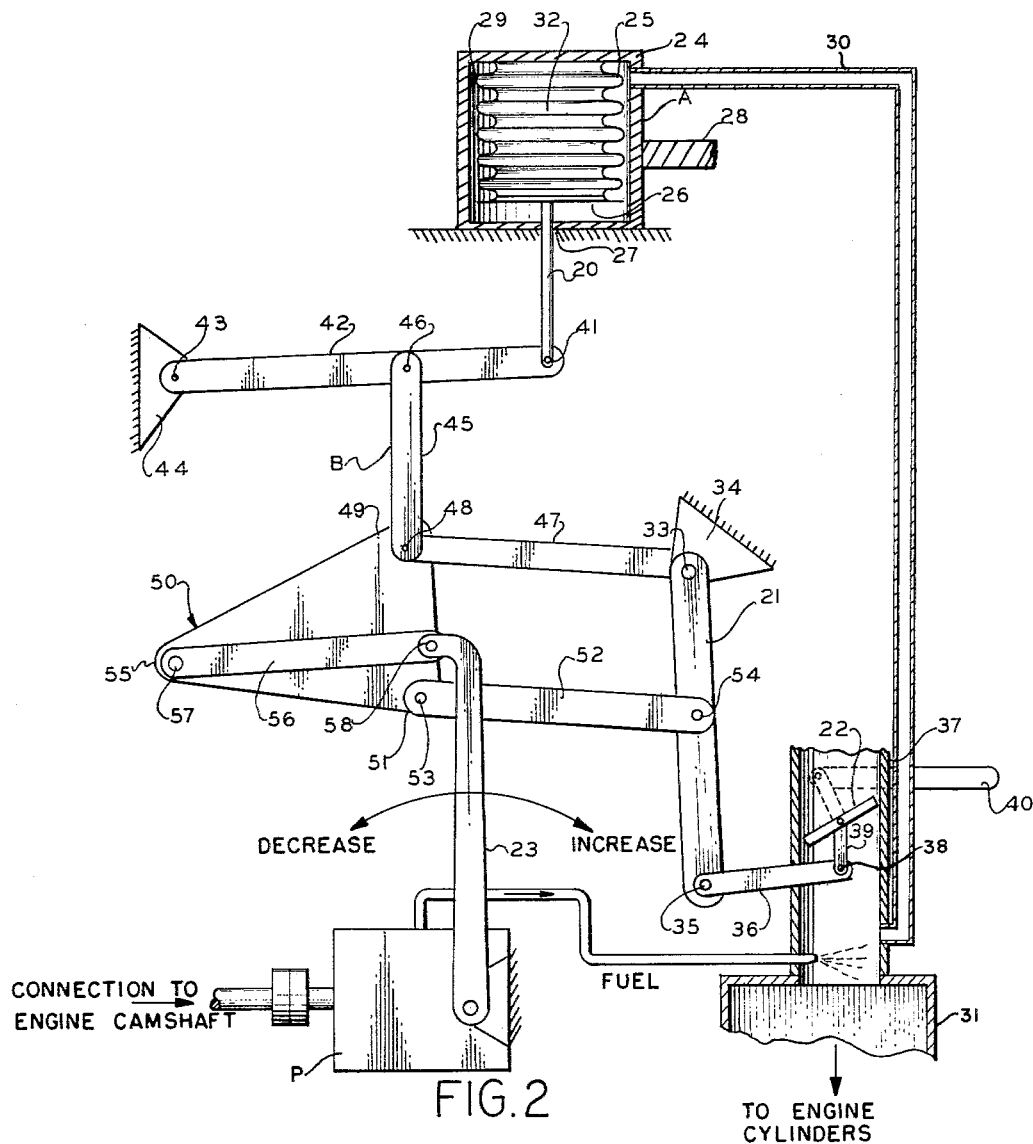
FIG. 2 is a schematic presentation of apparatus for controlling the air-fuel ratio for an Otto or four-stroke cycle engine in accordance with the method of the invention.

The method of the invention completely eliminates the use of engine speed as an indicator of unit air charge and in so doing, eliminates the complicated, expensive, and often unreliable apparatus which previous methods have used to relate intake manifold pressure and engine speed to unit air charge. The apparatus schematically presented in FIG. 2 is one embodiment of the many convenient apparatus arrangements for controlling air-fuel ratio which the method of the invention makes possible. The apparatus of FIG. 2 combines intake manifold pressure and throttle position in accordance with the relationship shown by lines such as the dashed lines 14, 15, 16, 17, and 19 of FIG. 1 so as to be representative of unit air charge and when combined with means responsive to manifold pressure and engine speed in terms of air-fuel ratio, the apparatus provides a control over the air-fuel ratio of an engine not previously possible without elaborate and expensive mechanisms.

The apparatus of FIG. 2 comprises a bellows assembly generally indicated by the letter A and having a rod 20 movably responsive to changes in intake manifold pressure, a throttle lever 21 responsive to throttle 22 position, a control lever 23 whose motion controls the quantity of fuel added to the air passing into an engine (not shown), and a linkage mechanism generally indicated by the letter B and which relates the motions of the rod 20 and the throttle lever 21 to each other and to the motion of the control lever 23 so that the motion of the control lever 23 is representative of the change in unit air charge with changes in intake manifold pressure and throttle position shown by the dashed lines of FIG. 1.

The control lever 23 is the control lever of any suitable known means for adding fuel to air such as a fuel injection system (not shown) of known type. The means for adding fuel to air or fuel injection system is driven directly or indirectly by the engine in known manner so as to be responsive to engine speed and is connected to the intake manifold of the engine in known manner so as to be responsive to intake manifold pressure. The means for adding fuel to air is constructed in known manner so that its response to changes in intake manifold pressure and engine speed vary its fuel output to the degree necessary to obtain the proper air-fuel ratio for maximum thermal efficiency or maximum horsepower provided the unit air charge remains constant.

The control lever 23 varies the fuel output of the means for adding fuel in known manner. Thus, its motion in response to intake manifold pressure and throttle position varies the fuel output of the means for adding fuel so that the fuel output based on intake manifold pressure and engine speed is adjusted to changes in unit air charge.

The bellows assembly A comprises a sealed cylindrical shell 24 and an expandable-collapsible bellows 25 positioned within the cylindrical shell 24 and having a plate 26 at its lower end which moves with expansion and collapse of the bellows 25 and to which the piston 20 is attached. The bellows assembly A is fixedly attached to any suitable structure 28 adjacent to the engine (not shown) and the piston 20 extends through an aperture 27 in the cylindrical shell 24. Suitable means of known type (not shown) is used to make the aperture 27 gastight.

The interior 29 of the cylindrical shell 24 is joined by tubing 30 to the intake manifold 31 of the engine. As a result, the gas pressures in the intake manifold 31 of the engine and in the interior 29 of the cylindrical shell will be the same. The bellows 25 is fixedly attached at one end to the cylindrical shell 24 and with the plate 26 at its other end, the bellows 25 defines a gas-tight interior 32.

The interior 32 is a vacuum and the weight of the plate 26 tends to expand the bellows 25. As a result, the expansion and collapse of the bellows 25 is dependent upon the changes in gas pressure in the interior 29 of the cylindrical shell 24. Thus, an increase in intake manifold 31 pressure will collapse the bellows 25 and a decrease in intake manifold 31 pressure will expand the bellows 25. It is in this manner that the piston 20 is made movably responsive to changes in intake manifold pressure.

The throttle lever 21 is pivotally attached at one end by a bolt 33 to a mounting bracket 34. At its other end, the throttle lever 21 is pivotally attached by a bolt 35 to a connector link 36 extending from the air channel 37 of the engine. Within the air channel 37 of the engine, the connector link 36 is pivotally attached by a bolt 38 to the end of a lever arm 39 which is attached to and moves with the throttle 22. The throttle 22 is moved in the usual and known manner by a throttle link 40. It is this arrangement which makes the throttle lever 21 responsive to throttle 22 positions. As the position of the throttle 22 changes, the throttle lever 21 pivots about the bolt 33.

The extending end of the piston 20 is pivotally attached by a bolt 41 to one end of an upper horizontal arm 42 of the linkage mechanism B. The upper horizontal arm 42 is pivotally attached at its other end by a bolt 43 to a bracket 44 fixedly positioned with reference to the cylindrical shell 24. One end of an upper vertical arm 45 of the linkage mechanism B is pivotally attached by a bolt 46 to the upper horizontal arm 42 between the bolts 41 and 43 and one end of an intermediate horizontal arm 47 is pivotally attached to the bracket 34 by extending the bolt 33 through it as well as through the throttle lever 21. The extending ends of the upper vertical arm 45 and the intermediate horizontal arm 47 are pivotally joined by extending a bolt 48 through the upper vertical arm 45, the intermediate horizontal arm 47 and the upper corner 49 of a triangular plate 50.

The lower corner 51 of the triangular plate 50 is pivotally joined to the throttle lever 21 by a lower horizontal arm 52 of the linkage mechanism B by inserting a bolt 53 through one end of the lower horizontal arm 52 and the lower corner 51 and a bolt 54 through the other end of the lower horizontal arm 52 and the throttle arm 21 between the bolts 33 and 35. The intermediate arm 47 and the lower horizontal arm 52 are of equal length and parallel to each other and serve to place the bolts 33, 48, 53, and 54 at the corners of a parallelogram.

The result of this arrangement of bolts 33, 48, 53 and 54 is that pivotal motion of the throttle lever 22 about the bolt 33 with changes in throttle 22 position causes a corresponding pivotal motion of a line between bolts 48 and 53 about the bolt 48. This pivotal motion of the bolt 53 with respect to the bolt 48 causes a corresponding pivotal motion of the triangular plate 50 about the bolt 48. The third corner 55 of the triangular plate 50 is pivotally joined to the control lever 23 by a control link 56 attached at one end to the triangular plate 50 by a bolt 57 and at its other end to the control lever 23 by a bolt 58. Thus, motion of the triangular plate 50 with changes in throttle 22 position causes a related motion of the third corner 55 of the triangular plate 50, the control link 56, and the control lever 23.

Similar to the throttle lever 21, motion of the piston 20 also causes motion of the triangular plate 50 and the lever arm 23. This is because motion of the piston 20 causes the upper horizontal arm 42 to pivot about the bolt 43 which in turn causes motion of the upper vertical arm 45. The motion of the upper vertical arm 45 moves the bolt 48, the triangular plate 50 and the lever arm 23.

In moving the bolt 48, the motion of the piston 20 changes the location of the point about which the triangular plate 50 pivots when the throttle 22 changes position and pivots the throttle lever 21 about the bolt 33. Thus, motion of the piston 20 not only moves the control lever 23 but it also changes the motion of the control lever 23 in response to throttle lever 21 motion.

The operation of the apparatus can be understood by considering the apparatus schematically shown in FIG. 2 together with the relationship among throttle 22 position, intake manifold 31 pressure, and unit air charge shown by the dashed lines of FIG. 1. The dashed lines of FIG. 1 show that as intake manifold 31 pressure increases, the unit air charge increases and the change in unit air charge for a given change in throttle 22 position increases. The apparatus of FIG. 2 causes control lever 23 motion as intake manifold 31 pressure increases which corresponds to the increase in unit air charge with increasing intake manifold 31 pressure shown by the dashed lines of FIG. 1 and it causes an increase in the amount of control lever 23 motion for a given change in throttle 22 position as intake manifold 31 pressure increases which corresponds to the increase in unit air charge change for a given change in throttle position as intake manifold 31 pressure increases shown by FIG. 1.

The apparatus provides for control arm 23 motion as intake manifold 31 pressure increases by raising the bolt 48 as the intake manifold 31 pressure increases, as the bolt 48 moves upward with piston 20 motion in response to increasing intake manifold 31 pressure, the intermediate horizontal arm 47 and lower horizontal arm 52 pivot upward about the bolts 33 and 54. This upward pivotal motion of the horizontal arms 47 and 52 pulls the triangular plate 50 toward the throttle lever 21.

As the triangular plate 50 moves upward and toward the throttle lever 21, the control link 56 pivots upward about the bolt 58.

The motion of the control lever 23 resulting from the motion of the triangular plate 50 toward the throttle lever 21 corresponds to the increases in unit air charge at constant throttle position with increases in intake manifold 31 pressure shown by FIG. 1. The moving of the bolt 48 toward the throttle lever 21 changes the position with respect to the control arm 23 of the arc of a circle described by the bolt 57 as the triangular plate 50 pivots about the bolt 48 with motion of the throttle lever 21. As the bolt 48 moves toward the throttle lever 21, this arc of a circle intersects the control lever 23 nearer the bolt 58 and becomes relatively more perpendicular to the control lever 23. This means that the component of bolt 57 motion toward the control lever 23 for a given motion along the arc of a circle increases as the bolt 48 moves toward the throttle lever 21 with increasing intake manifold 31 pressure. This increase in the component of bolt 48 motion toward the control lever 23 provides an increase in control lever 23 motion for the same motion of the throttle lever 21 which corresponds to the increasing amount of change in unit air charge associated with a given throttle 22 change as intake manifold pressure increases. Thus, the control lever 23 will not only move in response to motion of the throttle lever 21, but the amount of control lever 23 motion for a given motion of the throttle lever 21 will increase as intake manifold pressure increases.

Using the principles shown by the apparatus schematically presented in FIG. 2, it is possible to construct, using empirical or other techniques a linkage mechanism B for any four-stroke cycle engine which relates piston 20, throttle lever 21, and control lever 23 motion in such a manner as to be representative of the relationship shown by lines such as the dashed lines of FIG. 1 and which is suited to the method of the invention. The linkage mechanism B and others possible with the method of the invention are less complicated and expensive and more durable and reliable than previous mechanisms used in the control of air-fuel ratios and once constructed, the linkage mechanism and the method of the invention insure that changes in unit air charge are properly and conveniently used in controlling the air-fuel ratio of an engine.

Figure 3:
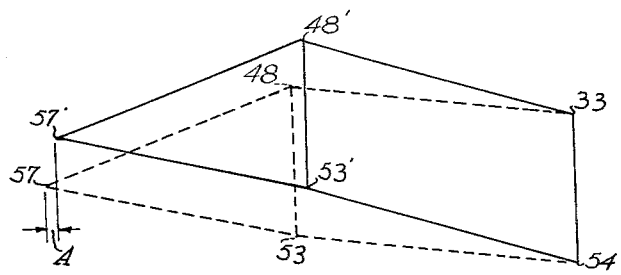
FIG. 3 is a schematic representation of the linkage of the invention showing the independent effect of changes in intake manifold pressure on the amount of fuel added to the engine.
Figure 4:
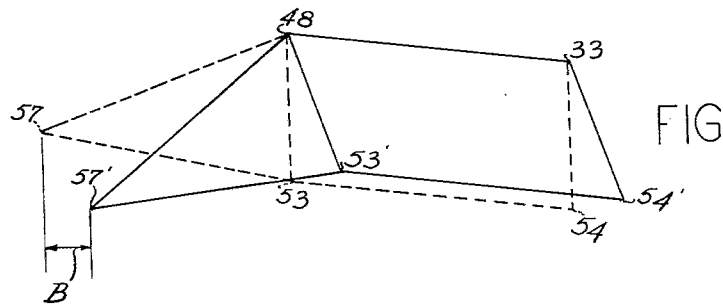
FIG. 4 is a schematic representation of the linkage of the invention showing the independent effect of changes in throttle position on the amount of fuel added to the engine.
Figure 5:
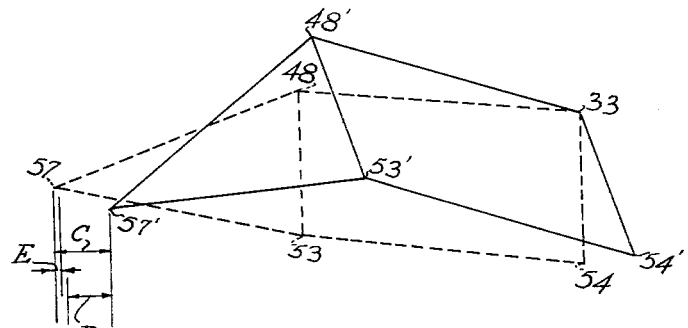
FIG. 5 is a schematic representation of the linkage of the invention showing the combined effect of changes in both manifold pressure and throttle position on the amount of fuel added to the engine.

Reference to FIGS. 3, 4 and 5 will show the change in relationships of the linkage mechanism B as throttle position and manifold pressure change. For example, the dashed lines of FIG. 3 indicate the normal position of the linkage mechanism B and the solid lines represent the linkage mechanism B when shifted due to a change in manifold pressure only. The effect on the amount of fuel added to the engine by this change in manifold pressure is indicated at A.

In FIG. 4, the dashed lines again represent the normal position of the linkage mechanism B. The solid lines represent the mechanism B when shifted due to a change in throttle position only and the effect on the amount of fuel added to the engine by this change in manifold pressure is indicated at B.

In FIG. 5, the dashed lines again represent the normal position of the linkage mechanism B. The solid lines represent the mechanism B when shifted due to a change in throttle position and manifold pressure. The effect of this change in manifold pressure and throttle position on the amount of fuel added to the engine is indicated at C. The difference between the effect of manifold pressure only and of both manifold pressure and throttle position on the amount of fuel added to the engine is indicated at D and the difference between the effect of throttle position only and of both throttle position and manifold pressure on the amount of fuel added to the engine is indicated at E.

It will be obvious that many variations may be made in the embodiment here chosen for the purpose of illustrating the present invention without departing from the scope thereof as defined by the appended claims.

What is claimed as invention is:

1. In a method of controlling the air-fuel ratio of a combustible mixture of air and fuel used by an internal combustion engine having an intake manifold pressure which changes and a throttle which changes angular position during the operation of the said engine, the air available for said combustible mixture changing in quantity during the operation of said engine and the said method comprising the step of varying the quantity of fuel used to obtain a combustible mixture with the actual quantity of air available in response to a mechanically established relationship betwen intake manifold pressure and the angular position of said throttle which is representative of the said actual quantity of air available whereby the resulting effect on the fuel added for a given change in throttle varies with changes in manifold pressure.

2. In a method of controlling the air-fuel ratio of a combustible mixture of air and fuel used by an internal combustion engine having an intake manifold pressure and an engine speed which change during operation of the engine and a throttle which changes position during operation of the engine, the air available for said combustible mixture changing in quantity during the operation of said engine and the said method comprising the step of varying the quantity of fuel used to obtain a combustible mixture with the actual quantity of air available in response to predetermined relationships among intake manifold pressure, engine speed and throttle position whereby the resulting effect on the fuel added for a given change in throttle varies with changes in manifold pressure, the said predetermined relationships being obtained independently of the actual flow of the said air available for said combustible mixture.

3. In a method of controlling the air-fuel ratio of a combustible mixture of air and fuel used by an internal combustion engine having an intake manifold pressure and engine speed which change during operation of the engine and a throttle which changes position during operation of the engine, the air available for said combustible mixture changing in quantity during operation of said engine and the said method comprising the step of varying the quantity of fuel used to obtain a combustible mixture with a quantity of air in response to a predetermined and varying relationship mechanically established between intake manifold pressure and engine speed and a predetermined and varying relationship mechanically established between intake manifold pressure and throttle position whereby the resulting effect on the fuel added for a given change in throttle varies with changes in manifold pressure, the relationship between intake manifold pressure and engine speed being representative of said theoretical air-fuel ratio and the relationship between intake manifold pressure and throttle position being representative of the said actual quantity of air available.

4. A method of maintaining the air-fuel ratio of a combustible mixture of air and fuel used by an internal combustion engine at those values necessary to obtain a particular criterion of engine performance as the intake manifold pressure, engine speed, and throttle position of the said engine change during operation of said engine, said method comprising, in combination, the steps of detecting changes in engine speed, manifold pressure and throttle position; of combining engine speed and intake manifold pressure with each other in a manner representative of the value of the theoretical air-fuel ratio necessary to maintain the particular criterion of engine performance at the intake manifold pressure and engine speed being detected; of combining intake manifold pressure and throttle position with each other in a manner representative of the actual quantity of air available for the combustible mixture at the intake manifold pressure and engine speed being detected; and of adding fuel to the actual quantity of air available to obtain the combustible mixture in accordance with the relationship obtained between intake manifold pressure and engine speed and the relationship obtained between intake manifold pressure and throttle position, whereby the resulting effect on the fuel added for a given change in throttle varies with changes in manifold pressure.

5. A method of maintaining the air fuel ratio of a combustible mixture of air and fuel used by an internal combustion engine at those values necessary to obtain a particular criterion of engine performance as the said values vary with intake manifold pressure and engine speed and as the quantity of air available for the mixture varies with intake manifold pressure and engine speed, said method, comprising, in combination, the steps or relating engine speed and intake manifold pressure to each other in a manner representative of the value of the theoretical air-fuel ratio necessary to maintain the particular criterion of engine performance at the existing intake manifold pressure and engine speed; of relating intake manifold pressure and throttle position to each other in a manner representative of the actual quantity of air available for the mixture at the then existing intake manifold pressure and engine speed; and of adding fuel to the actual amount of air available to obtain the combustible mixture in accordance with the relationship obtained between intake manifold pressure and engine speed and the relationship obtained between intake manifold pressure and throttle position, whereby the resulting effect on the fuel added for a given change in throttle varies with changes in manifold pressure.

6. Apparatus for varying the amount of fuel added to air drawn into an internal combustion engine having an engine speed, an intake manifold pressure and a throttle position which change over the operating range of the engine, said fuel being added by a pump device responsive to engine speed and intake manifold pressure so as to vary the amount of fuel added to the extent necessary to maintain those theoretical air-fuel ratios necessary for a given criterion of engine performance over the operating range of the engine if the quantity of air drawn into the engine remains constant and said apparatus comprising, in combination, means for detecting changes in intake manifold pressure as the intake manifold pressure varies over the operating range of the engine, throttle responsive means operatively connected to the throttle and movable with the throttle as the throttle position varies over the operating range of the engine, and means responsive to the said intake manifold pressure detecting means and to the said throttle responsive means for varying the amount of fuel added by the pump device as the actual quantity of air drawn into the engine varies over the operating range of the engine, whereby the resulting effect on the fuel added for a given change in throttle varies with changes in manifold pressure.

7. Apparatus for maintaining the air-fuel ratio of a combustible mixture of air and fuel used by an internal combustion engine at that changing value necessary to obtain a particular performance criterion over the operating range of the engine, said engine having an intake manifold pressure, an engine speed, a unit air charge and a throttle position which change over the operating range of the engine, said changing value of the theoretical air-fuel ratio being a function of intake manifold pressure and engine speed if the unit air charge drawn into the engine remains constant, and said apparatus comprising, in combination, means responsive to intake manifold pressure and engine speed for adding fuel to a unit air charge of constant quantity in accordance with the functional relationship between engine speed and intake manifold pressure to achieve the theoretical value of the air-fuel ratio, and control means mechanically responsive to said throttle position and such intake manifold pressure, said control means changing the quantity of fuel added to the changing actual unit air charge over the operating range of the engine in accordance with the said relationship existing between intake manifold pressure and throttle position, whereby the resulting effect on the fuel added for a given change in throttle varies with changes in manifold pressure.

8. Apparatus for controlling the air-fuel ratio of a combustible mixture of air and fuel used in an internal combustion engine having an intake manifold pressure and throttle position which change over the operating range of the engine, said apparatus having means for detecting changes in intake manifold pressure and throttle position in terms of the actual quantity of air available indicated by each relationship between intake manifold pressure and throttle position, and means responsive to the means for indicating changes in intake manifold pressure and throttle position for varying the amount of fuel added to the actual quantity of air of the mixture in order to obtain a particular air-fuel ratio, whereby the resulting effect on the fuel added for a given change in throttle varies with changes in manifold pressure.

9. Apparatus for controlling the air-fuel ratio of a combustible mixture of air and fuel used in an internal combustion engine having an intake manifold pressure and throttle position which change over the operating range of the engine, said apparatus having means for mechanically combining said intake manifold pressure and said throttle position to provide a mechanical output representative of actual unit air charges over the operating range of the engine, and means responsive to said mechancial output for varying the amount of fuel added to the actual unit air charge available so that the amount of fuel and the unit air charge provide a particular air-fuel ratio, whereby the resulting effect on the fuel added for a given change in throttle varies with changes in manifold pressure.

10. Apparatus for maintaining a predetermined air-fuel ratio for the combustible mixture of air and fuel for an internal combustion engine including a throttle adjusting means, a fuel pump having a normal output responsive to the speed of said engine and manifold pressure, control means available in response to variations in manifold pressure, and means for modifying the said output of said fuel pump in response to the combined motions of the adjusting means and the control means, whereby the resulting effect on fuel added for a given change in throttle varies with changes in manifold pressure.

References Cited by the Examiner

UNITED STATES PATENTS

| | | | |
|---|---|---|---|
| 2,031,527 | 2/1936 | Dodson | 123—139 |
| 2,508,312 | 5/1950 | Udale | 123—139 |
| 2,841,129 | 7/1958 | Reggio | 123—139 |
| 2,925,075 | 2/1960 | Mueller | 123—139 |
| 2,949,903 | 8/1960 | Dietrich | 123—119 |

KARL J. ALBRECHT, *Primary Examiner.*